United States Patent
Ottamalika et al.

(10) Patent No.: US 7,930,693 B2
(45) Date of Patent: Apr. 19, 2011

(54) METHOD AND SYSTEM FOR ACCESSING AND LAUNCHING A JAVA BASED APPLET AS A LOCALLY INSTALLED APPLICATION

(75) Inventors: Iqlas Maheen Ottamalika, San Jose, CA (US); Maximilian J. Spring, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 372 days.

(21) Appl. No.: 11/099,395

(22) Filed: Apr. 4, 2005

(65) Prior Publication Data

US 2006/0225058 A1    Oct. 5, 2006

(51) Int. Cl.
*G06F 9/44* (2006.01)
*G06F 9/445* (2006.01)
*G06F 15/16* (2006.01)

(52) U.S. Cl. .................... 717/173; 717/178; 709/219

(58) Field of Classification Search .............. 717/120, 717/122, 162, 168, 170, 171, 174; 711/153; 709/227, 228
See application file for complete search history.

(56) References Cited

U.S. PATENT DOCUMENTS

| | | | |
|---|---|---|---|
| 5,155,847 A * | 10/1992 | Kirouac et al. ............. | 709/221 |
| 5,732,275 A * | 3/1998 | Kullick et al. .............. | 717/170 |
| 5,764,992 A * | 6/1998 | Kullick et al. .............. | 717/170 |
| 5,809,287 A * | 9/1998 | Stupek et al. ............... | 703/22 |
| 5,881,236 A * | 3/1999 | Dickey ....................... | 709/221 |
| 5,919,247 A | 7/1999 | van Hoff | |
| 5,923,885 A * | 7/1999 | Johnson et al. ............. | 717/176 |
| 5,960,189 A * | 9/1999 | Stupek et al. ............... | 717/169 |
| 6,006,034 A * | 12/1999 | Heath et al. ................ | 717/170 |
| 6,139,177 A * | 10/2000 | Venkatraman et al. ....... | 700/83 |
| 6,381,631 B1 | 4/2002 | van Hoff | |
| 6,430,570 B1 * | 8/2002 | Judge et al. ................. | 717/166 |
| 6,470,494 B1 * | 10/2002 | Chan et al. .................. | 717/166 |
| 6,513,158 B1 * | 1/2003 | Yogaratnam ................ | 717/166 |
| 6,546,554 B1 * | 4/2003 | Schmidt et al. ............. | 717/176 |
| 6,654,954 B1 * | 11/2003 | Hicks ......................... | 717/162 |
| 6,675,201 B1 | 1/2004 | Parkkinen | |
| 6,675,381 B1 * | 1/2004 | Yamaguchi ................. | 717/168 |
| 6,826,750 B1 * | 11/2004 | Curtis et al. ................ | 717/170 |

(Continued)

FOREIGN PATENT DOCUMENTS

CN    1467629    1/2004

(Continued)

OTHER PUBLICATIONS

Huawei Technologies, Co. Ltd.; English Abstract of CN publication No. 1467629; Jan. 14, 2004; 1 page.

(Continued)

*Primary Examiner* — Tuan Q Dam
*Assistant Examiner* — Hanh T Bui
(74) *Attorney, Agent, or Firm* — Stolowitz Ford Cowger LLP

(57) ABSTRACT

A method for launching an interface with a remotely located electronic device. Specifically, a loader that is locally installed is launched. The loader is associated with an embedded application stored on a remote device. Communication is established with the remote device to access a first checksum value that is stored on the remote device. Thereafter, the first checksum value is compared against a second checksum value of a locally stored version of the embedded application. The locally stored version of the embedded application is launched when the first check value matches the second checksum value.

20 Claims, 5 Drawing Sheets

U.S. PATENT DOCUMENTS

| | | | |
|---|---|---|---|
| 6,836,657 B2* | 12/2004 | Ji et al. | 455/419 |
| 6,910,066 B1* | 6/2005 | Pohl | 709/203 |
| 6,986,133 B2* | 1/2006 | O'Brien et al. | 717/173 |
| 7,131,122 B1* | 10/2006 | Lakhdhir | 717/168 |
| 7,194,506 B1* | 3/2007 | White et al. | 709/203 |
| 7,304,758 B2* | 12/2007 | Ferlitsch | 358/1.15 |
| 7,363,623 B2* | 4/2008 | Kishida | 717/174 |
| 2002/0002595 A1* | 1/2002 | Blumenau | 709/218 |
| 2002/0078262 A1* | 6/2002 | Harrison et al. | 709/331 |
| 2002/0095522 A1* | 7/2002 | Hayko et al. | 709/311 |
| 2002/0196460 A1* | 12/2002 | Parry | 358/1.15 |
| 2003/0009694 A1* | 1/2003 | Wenocur et al. | 713/201 |
| 2003/0041110 A1* | 2/2003 | Wenocur et al. | 709/206 |
| 2003/0084440 A1* | 5/2003 | Lownes | 725/6 |
| 2003/0093508 A1* | 5/2003 | Li et al. | 709/222 |
| 2003/0208569 A1* | 11/2003 | O'Brien et al. | 709/221 |
| 2004/0003034 A1* | 1/2004 | Sun et al. | 709/203 |
| 2004/0054800 A1* | 3/2004 | Shah et al. | 709/231 |
| 2004/0092255 A1* | 5/2004 | Ji et al. | 455/419 |
| 2004/0261069 A1* | 12/2004 | Verbeke et al. | 717/166 |
| 2005/0102669 A1* | 5/2005 | Marney et al. | 717/174 |
| 2005/0114852 A1* | 5/2005 | Chen et al. | 717/168 |
| 2005/0132179 A1* | 6/2005 | Glaum et al. | 713/1 |
| 2005/0138037 A1* | 6/2005 | Son et al. | 707/10 |
| 2005/0144514 A1* | 6/2005 | Ulrich et al. | 714/6 |
| 2005/0240919 A1* | 10/2005 | Kim et al. | 717/168 |
| 2006/0004737 A1* | 1/2006 | Grzonka | 707/4 |
| 2006/0075004 A1* | 4/2006 | Stakutis et al. | 707/204 |
| 2006/0130041 A1* | 6/2006 | Pramanick et al. | 717/168 |
| 2007/0067581 A1* | 3/2007 | Baek | 711/153 |

FOREIGN PATENT DOCUMENTS

| | | |
|---|---|---|
| WO | 2006107872 | 10/2006 |

OTHER PUBLICATIONS

European Patent Office; European Search Report and Opinion; EP 06749161.3; Nov. 26, 2009; 7 Pages.

International Bureau of WIPO; International Preliminary Report on Patentability PCT/US2006/012307; Oct. 9, 2007; 1 Page.

International Bureau of WIPO; International Search Report and Written Opinion PCT/US2006/012307; Oct. 5, 2006; 5 Page.

\* cited by examiner

METHOD AND SYSTEM FOR ACCESSING AND LAUNCHING A JAVA BASED APPLET AS A LOCALLY INSTALLED APPLICATION

BACKGROUND OF THE INVENTION

1. Field of the Invention

Embodiments of the present invention relate to the field of Java-based embedded device management applications. More particularly, embodiments of the present invention relate generally to accessing and launching a locally stored version of the Java-based embedded device management applications from a client workstation.

2. Related Art

An embedded application (e.g., device management application) is an application which neither needs to be explicitly installed on a client workstation, nor actually installs pieces on a client workstation. The embedded application comes with the device and can be accessed through some network (e.g., the Internet). As soon as there is Internet protocol (IP) connectivity between a client workstation and the device, a user can bring up the embedded application within a browser on the client workstation.

The advantages of having an embedded application is that a user that is Web-enabled can access the embedded application and interact with the embedded application without having to load or install anything onto the client workstation. As a result, via any workstation that is Web-enabled, a user can access and interact with the embedded application.

Prior Art FIG. 1 is a flow diagram of the flow of information through a conventional network 100 that is capable of interfacing with the networking device 110 while ensuring that a compatible version of the embedded application is used to interface with the networking device 110. In the conventional network 100, an applet (java based technology) allows the client to run the version of the embedded application that is compatible with the networking device 110.

More specifically, the loader 115 and the embedded application that is used to interface with the networking device 110 are stored on the networking device. The loader is used to launch the embedded application on a client workstation 130.

As shown in Prior Art FIG. 1, in step 1, the loader 115 is installed into a browser window through a java plug-in (e.g., java virtual machine) located on the client workstation 130. In steps 2 and 3, the loader 115 executes in the client workstation 130 via the browser window 140 in order to pull the embedded application from the networking device 110 to the client workstation 130. That is, the loader 115 extracts the embedded application 125 for use on the client workstation 130. More specifically, client workstation 130 implements the embedded application as a Java applet, that is running within the Java virtual machine (JVM) of the browser 140 on the client workstation 130. As such, the user can access the application through another window 140. In this way, through step 4, the user can interface with the networking device 110 using the java based embedded application, for example to configure the networking device 110.

While the use of the java based applet through the browser window 140 ensures that a compatible version of the embedded application is used to interface with the networking device, the browser interface is slow and inefficient. That is, the embedded application must be downloaded each time the client wants to interface with the networking device, which is an inefficient use of resources. Also, if two networking devices use the same version of an embedded application, two separate but identical copies of the embedded application are downloaded. Additionally, if the client is connecting to the networking device 110 through a secure socket layer (SSL) numerous dialog boxes are presented in order to guide the user through the downloading process. However, these dialog interfaces are also slow and cumbersome from the user perspective. Furthermore, since the embedded application is stored on the networking device 110, the user is limited in terms of runtime parameters, such as memory allocated to the embedded application, etc.

BRIEF DESCRIPTION OF THE DRAWINGS

Prior Art

DETAILED DESCRIPTION OF THE INVENTION

Reference will now be made in detail to the preferred embodiments of the present invention, a method and system for accessing and launching a java based embedded application of a remote device (e.g., applet) as a locally installed application, examples of which are illustrated in the accompanying drawings.

Accordingly, various embodiments of the present invention disclose a method and system for accessing and launching a java based embedded application of a remote device (e.g., applet) as a locally installed application. Embodiments of the present invention are capable providing the advantages of both a java based applet model framework and an application model framework to access and launch an embedded application as a locally installed application. For instance, embodiments of the present invention are able to access the launcher through a browser interface, so that no other software is needed to initially load of automatically upgrading the version of the embedded application that is locally stored to match the version of the embedded application stored on the remote device. In addition, embodiments of the present invention provide for the ability to launch directly from the client workstation, thereby bypassing a browser interface and effectively increasing the speed and efficiency when executing the java based embedded application that interfaces with the remote device.

Notation and Nomenclature

Figure 1:
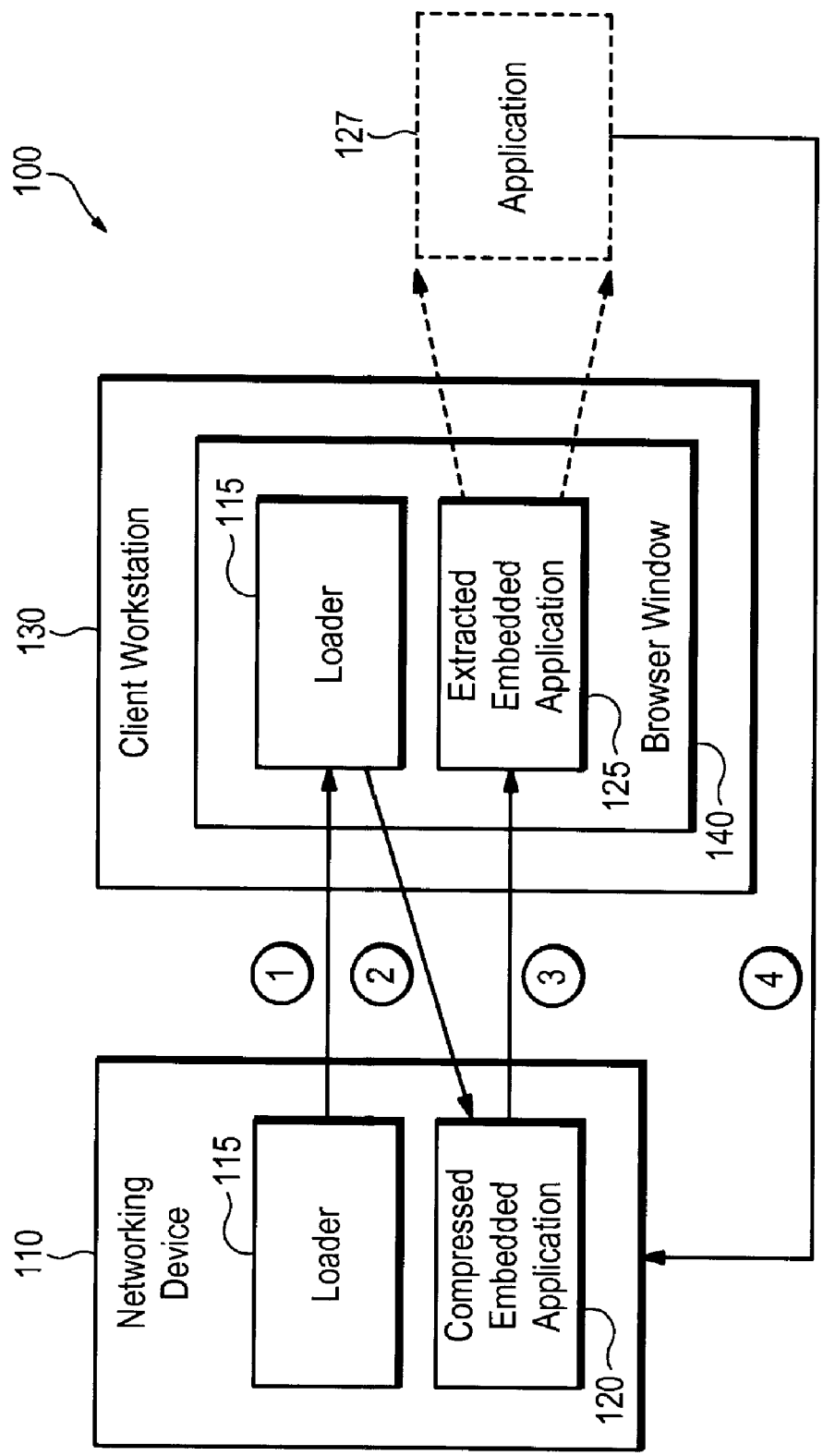
FIG. 1 is a block diagram of a conventional system that launches and executes a java based embedded application through a browser on a client workstation.
Figure 2:
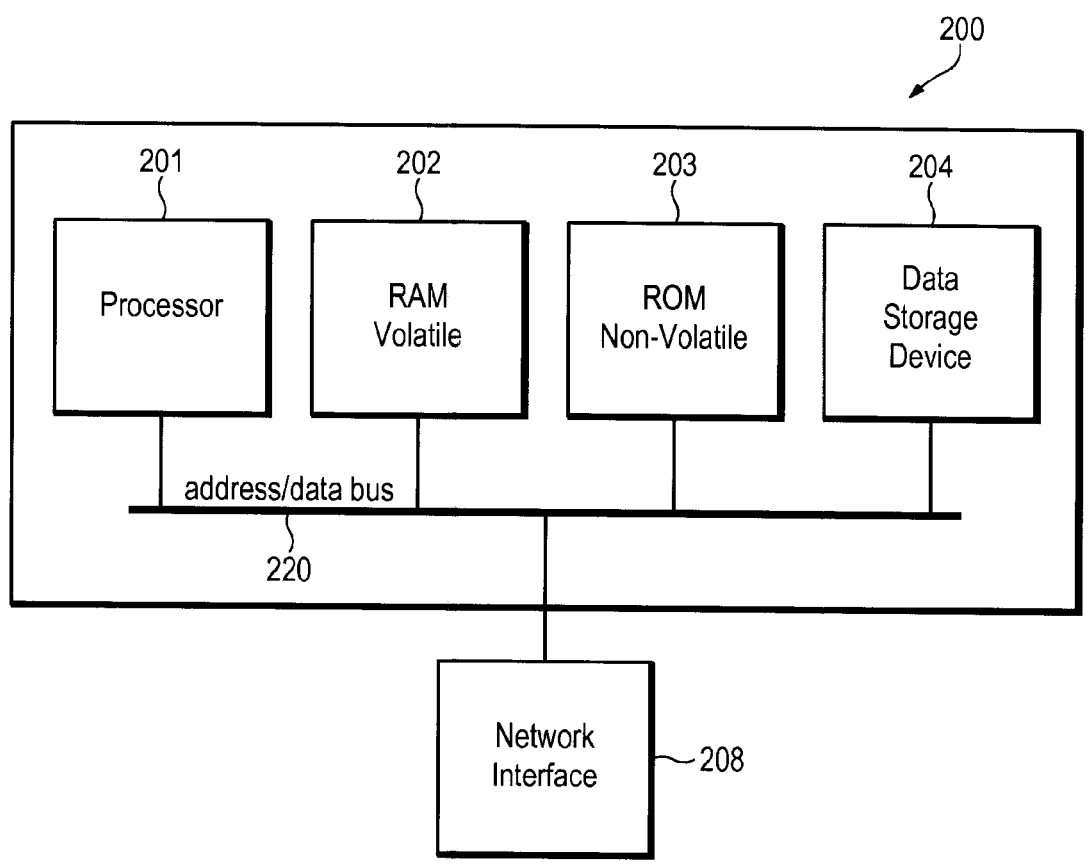
FIG. 2 is a block diagram of an electronic device that is capable of accessing and launching a java based embedded application of a remote device as a locally installed application, in accordance with one embodiment of the present invention.

Referring now to FIG. 2, portions of the present invention are comprised of computer-readable and computer-executable instructions which reside, for example, in computer-readable media of an electronic system that are capable of accessing networked devices, such as, a server computer, mainframe, networked computer, workstation, hub, router, switch, firewall, access server, and the like. FIG. 2 is a block diagram of interior components of an exemplary electronic system 200, upon which embodiments of the present invention may be implemented.

Exemplary electronic system 200 includes an address/data bus 220 for communicating information, a central processor 201 coupled with the bus 220 for processing information and instructions, a volatile memory 202 (e.g., random access memory (RAM), static RAM dynamic RAM, etc.) coupled with the bus 220 for storing information and instructions for the central processor 201, and a non-volatile memory 203 (e.g., read only memory (ROM), programmable ROM, flash memory, EPROM, EEPROM, etc.) coupled to the bus 220 for storing static information and instructions for the processor 201.

Exemplary electronic system 200 also includes an optional data storage device 204 (e.g., cache memory, memory card, hard drive, etc.) coupled with the bus 220 for storing information and instructions. Data storage device 204 is removable, in one embodiment. With reference still to FIG. 2, a network interface 208 (e.g., signal input/output device) is provided which is coupled to bus 220 for providing a communication link between electronic system 200 and a network environment. As such network interface 208 enables the central processor unit 201 to communicate with or monitor other electronic systems (e.g., networked devices) or coupled to a communication network.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "launching," "accessing," "comparing," "executing," "storing," "downloading," or the like, refer to the action and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Method and System for Interfacing with Networked Devices

Figure 3:
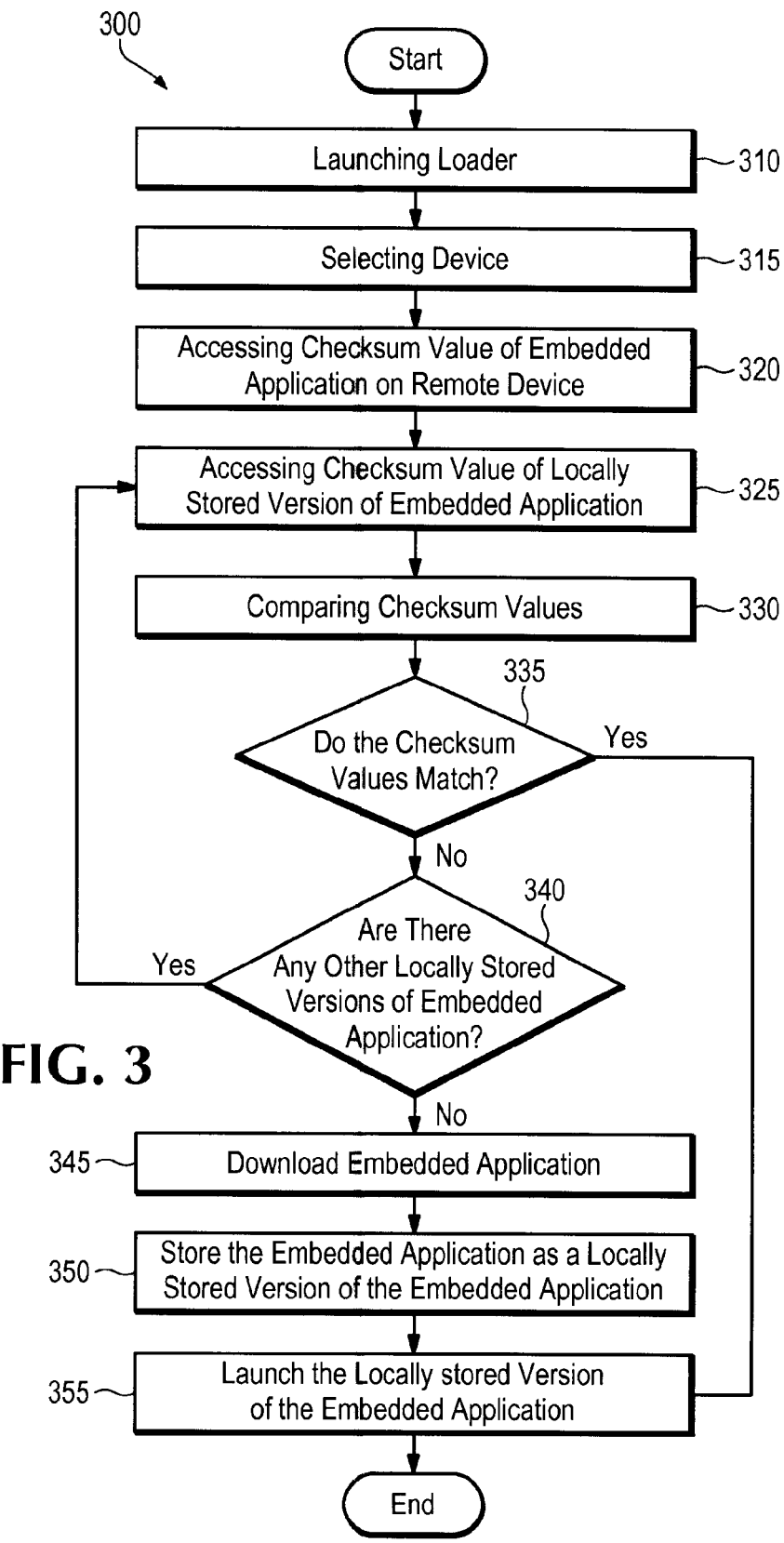
FIG. 3 is a flow chart illustrating steps in a computer implemented method for accessing and launching a java based embedded application as a locally installed application in order to provide a local interface with the remote device, in accordance with one embodiment of the present invention.
Figure 4:
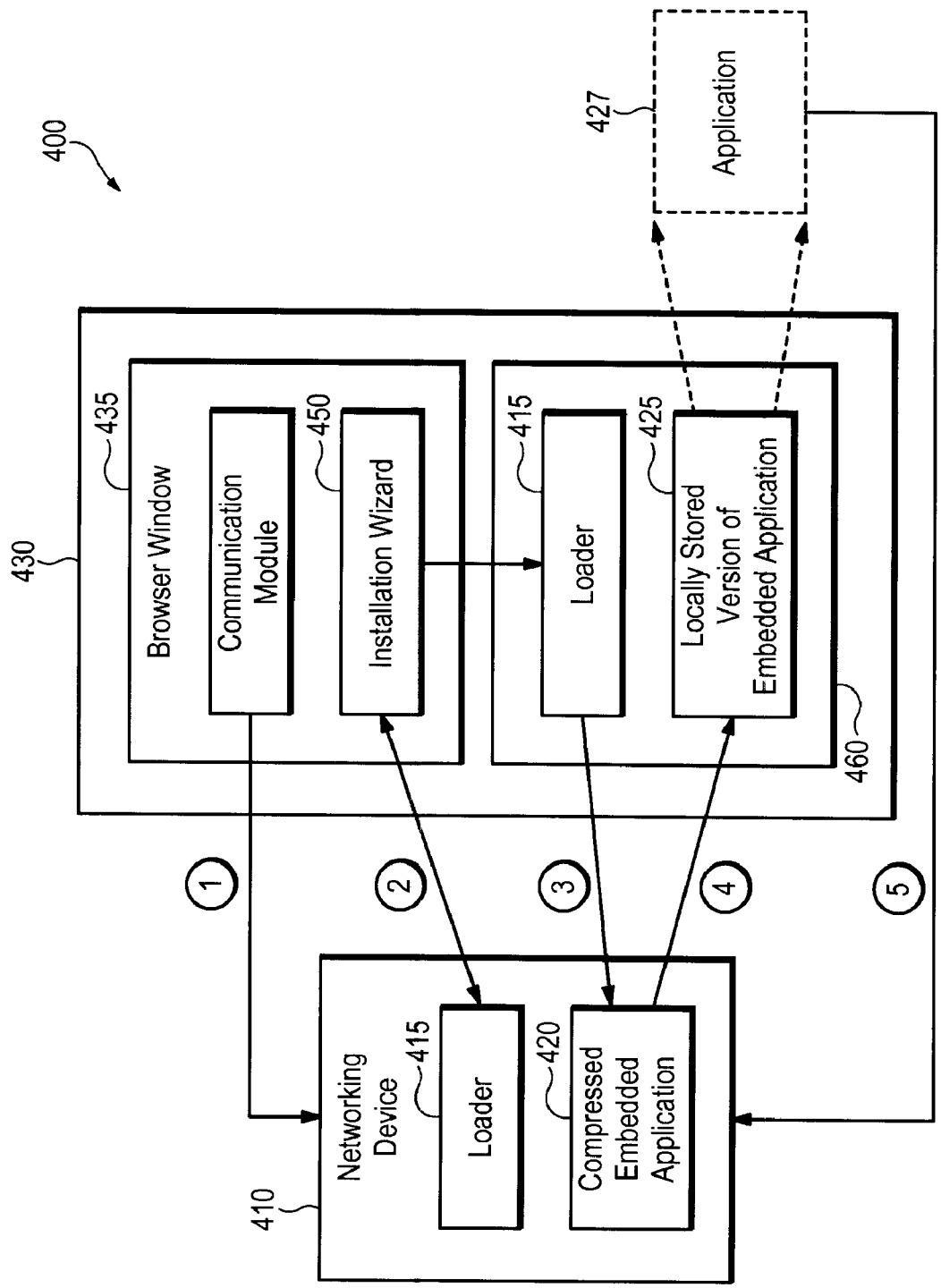
FIG. 4 is a flow diagram illustrating the flow of information when installing the loader and a locally stored version of an embedded application, in accordance with one embodiment of the present invention.
Figure 5:
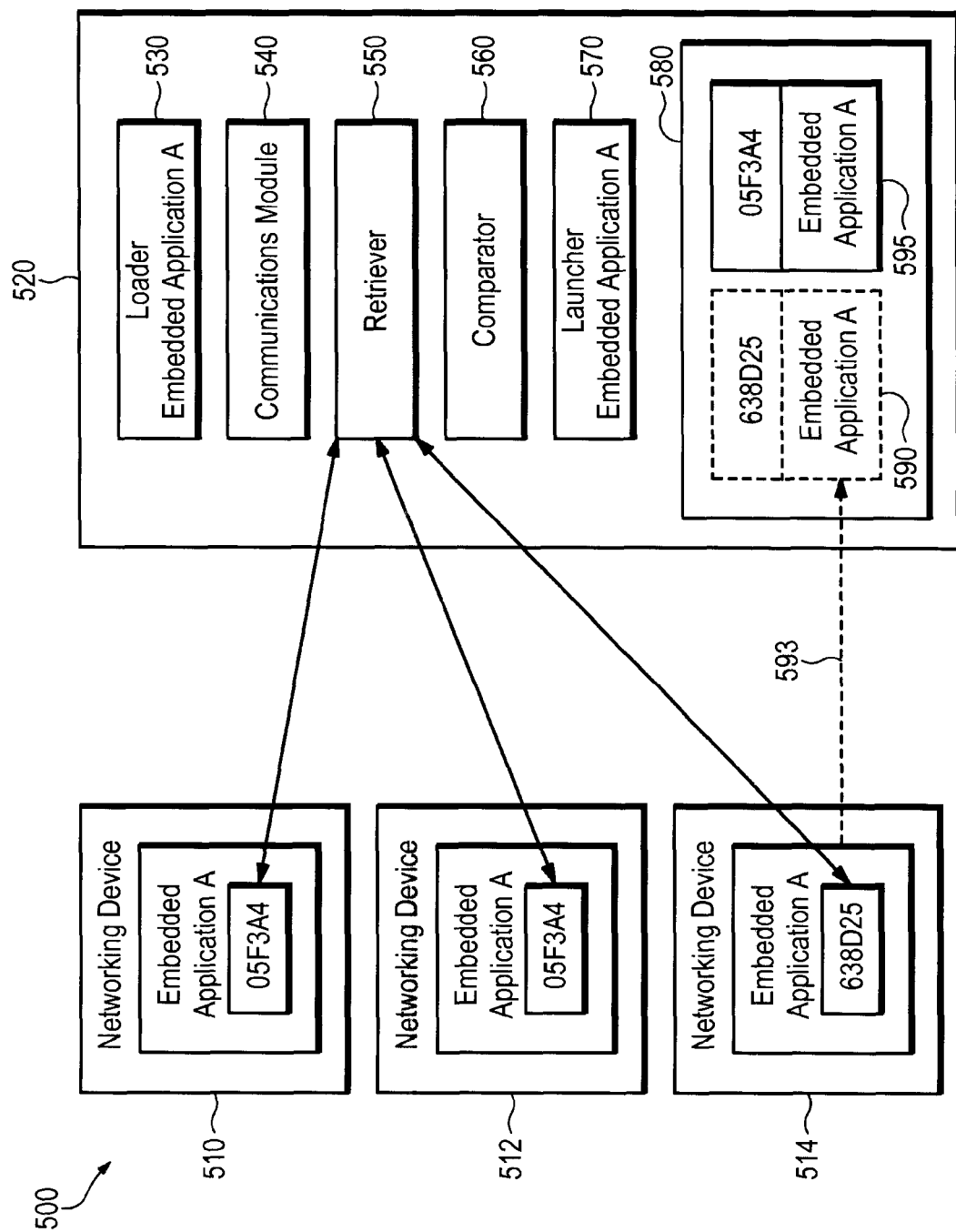
FIG. 5 is a block diagram illustrating a client workstation that is capable of storing embedded applications on a per application basis, in accordance with one embodiment of the present invention.

The flow chart of FIG. 3 and the flow diagrams of FIGS. 4 and 5 describe the processes used for accessing and launching a java based embedded application as a locally installed application by a client workstation, in accordance with embodiments of the present invention. Accessing the embedded application as a locally installed application allows for a more efficient use of the embedded application since a browser interface is bypassed. In addition, embodiments of the present invention are capable of automatically upgrading the locally stored version of the embedded application to be compatible with the embedded application used to interface with the networking device.

Referring now to FIG. 3, a flow chart 300 is disclosed illustrating steps in a computer implemented method for accessing and launching the embedded application that is locally stored on a client workstation, in accordance with one embodiment of the present invention. The method as disclosed in the present embodiment avoids the slow downloading of the application code from the remote device, as in conventional techniques. That is, the user is able to launch the application much quicker, since it is installed locally at the client workstation, without going through a browser interface.

At 310, the present embodiment launches a loader. The loader is used to invoke a java based embedded application with a remote electronic device. In particular, the present embodiment launches a loader that is locally installed, for example on a client workstation. As such, the loader is used to invoke the java based embedded application that is locally installed on the client workstation. Since the loader is installed on the client workstation, the loader can be executed without the use of a browser interface.

The core embedded application is stored on the remote device and is used to interface with the remote electronic device. That is, the remote device is associated with and is the source of an embedded application. As such, the embedded application stored on the remote device is the default version of the embedded application used to interface with the embedded device. For example, the embedded application can be a device management application that allows a user to interact with and configure the device.

At 315, the present embodiment selects the remote device for interfacing. More specifically, the launcher is able to launch a particular embedded application of varying versions that are used to interface with one or more remote devices. As such, a remote device is selected by the present embodiment in order to determine which version of the embedded application is compatible with the particular remote device that is selected.

In particular, the present embodiment establishes communication with the remote device. Communication between the client workstation and the remote device is necessary to determine which version of the embedded application is stored on the remote device. That is, the version of the embedded application is the version used to interface with the remote device.

In one embodiment, a checksum value of the embedded application is used to determine the version of the embedded application stored on the remote device. As such, the present embodiment establishes communication to access a first checksum value of the embedded application that is stored on the remote device at 320.

In one embodiment, the MD-5 hash algorithm is applied on the embedded application stored on the remote device to determine the checksum value associated with the embedded application used to interface with the remote device. As such, any embedded application having the same checksum value can be used to interface with the remote device, and is effectively running the same version of the embedded application.

The MD-5 hash algorithm is used to calculate a 16 byte checksum in one embodiment, for example. In another embodiment, a 128 bit value is calculated for the checksum. In still other embodiments other bit values can be used to determine the checksum.

At 325, the present embodiment accesses the second checksum value of the locally stored version of the embedded application. In this way, the present embodiment can determine if the version of the locally stored embedded application is the same or is compatible with the version of the embedded application stored on the remote device.

As such, at 330, the present embodiment compares the checksum values. More particularly, the present embodiment compares the first checksum value of the embedded application against the second checksum value of the locally stored version of the embedded application.

At 335, the present embodiment determines if the first checksum value matches the second checksum value. That is, the present embodiment determines if the first checksum value of the embedded application stored at the remote device matches (e.g., is identical) to the second checksum value of the locally stored version of the embedded application.

If the checksum values match, then the present embodiment proceeds to 355 to launch the locally stored version of the embedded application. That is, when the first checksum value of the embedded application matches the second checksum value, then the locally stored version of the embedded application is launched. That is, the locally stored version of the embedded application can be used to interface with the remote device since they are of the same version.

On the other hand, if the checksum values do not match, then the present embodiment proceeds to 340. At 340, the present embodiment determines if there are any other locally stored versions of the embedded application. If there are more locally stored versions of the embedded application, then the present embodiment locates another version and then returns to 325 to do the checksum accessing and comparison.

More specifically, the present embodiment compares the first checksum value of the embedded application with a plurality of checksum values of a plurality of locally stored versions of the embedded application to determine if one of the plurality of checksum values, as the second checksum value, matches the first checksum value. If there is a match, then the corresponding version of the locally stored embedded application can be used to interface with the remote device.

However, if there are no other locally stored versions of the embedded application, then the present embodiment proceeds to 345 to automatically upgrade the embedded application on the client workstation. That is, the present embodiment determines that the client workstation does not have a compatible version of the embedded application stored locally on the client workstation.

As such, the present embodiment continues by retrieving the java based applet from the remote device for implementing the embedded application. That is, in the present case, a Java applet is transferred from the remote device to the client workstation. In one embodiment, the embedded application is included within the Java applet. Moreover, in one embodiment the same software code base can be used for both the applet and the embedded application which makes the software development process much smoother. As a result, the present embodiment is capable of downloading the embedded application using any file transfer protocol (e.g., HTTP, HTTPS, etc.) to pull the embedded application stored on the remote device and install the embedded application locally on the client workstation.

As such, at 350 the present embodiment stores the downloaded embedded application as the locally stored version of the embedded application. For example, the embedded application is stored in the memory (e.g., hard drive) of a client workstation.

After the embedded application is downloaded and stored as a locally stored versions of the embedded application, the present embodiment then proceeds to 355 to launch the locally stored version of the embedded application to interface with the remote device.

FIG. 4 is a flow diagram 400 illustrating the flow of information between the networking device 410 and the client workstation 430 when accessing and installing the embedded application, in accordance with one embodiment of the present invention.

In one embodiment, the loader 415 is installed on the client workstation 430. That is, when the embedded application is executed for the first time, the loader 415 is installed on the client workstation 430 through a browser interface 435. In particular, the present embodiment begins by establishing communication with the networking device 410, as is shown in path 1. The communication is established through a browser interface 435 that is Java-enabled on the client workstation 430.

As such, for example, at the client workstation 430, a user can interact with and access the networking device 410 through the browser interface 435 in order to install the loader 415 onto the client workstation 430. As shown by path 2, the present embodiment uses the installation wizard 450 to prompt the user for installation of the loader 415 from the networking device.

After installation of the loader 415 by the installation wizard 450, the present embodiment uses the installation wizard 450 to install the loader into the memory 460 (e.g., hard drive) of the client workstation 430. Thereafter, the loader 415 can be launched directly on the client workstation without the use of the browser interface 435.

FIG. 4 also illustrates the flow of information when installing the embedded application 420 from the networking device 410 onto the client workstation 430, in accordance with one embodiment of the present invention. For instance, the flow diagram 400 is illustrative of the operations performed at 345 and 350 of FIG. 3.

In the present embodiment, the loader 415 is executed independently of the browser interface 435. That is, the loader can be launched directly from the client workstation (e.g., through invoking an icon associated with the loader 415). If the present embodiment determines that the present embodiment does not have the proper version of the embedded application or does not have the embedded application locally stored, then the loader is able to directly communicate with the networking device 410 as shown in path 3 of FIG. 4 to access the embedded application 420 that is stored on the networking device 410. As shown in FIG. 4, the embedded application is typically compressed to utilize memory resources on the networking device efficiently.

The present embodiment then downloads the embedded application 420 from the networking device 410 to the client workstation 430. That is, the present embodiment, over path 4 downloads and extracts the embedded application for storing on the client workstation 430 in memory 460. As such, the present embodiment is capable of providing a locally stored version of the embedded application 425 on the client workstation 430.

Thereafter, the embedded application can be executed through a window 427 directly and without the use of the browser interface 435. As such, the user can execute the application through window 427 to interface with the networking device 410 (e.g., for configuration purposes).

FIG. 5 is a flow diagram 500 illustrating the per-application function of the loading capability of the client workstation 520, in accordance with one embodiment of the present invention. The advantage of the per-application function of the present embodiment is that one copy of a particular version of the embedded application (e.g., embedded application A) need be stored on the client workstation 520. As such, the single copy of the particular version can be used to interface with all networking devices using that particular version as an interface (e.g., configuration interface). This is a distinct advantage over the per-device function of conventional loading systems where each embedded application must be downloaded for every networking device in a one-to-one relationship. That is, even though two networking devices use the same version of an embedded application as an interface, two separate copies of the same embedded application need to be downloaded to the client workstation 520, which is a waste of resources.

As shown in FIG. 5, the client workstation 520 is able to interface with three networking devices, network device 510, networking device 512, and networking device 514. Each of the networking devices 510, 512, and 514 have the same embedded application A that is used to interface with the devices (e.g., for configuration purposes).

However, different versions of the embedded application A are used for interfacing. In one embodiment, the checksum value of the embedded application that is stored on the networking device is used to identify the version. For example, the networking device 510 has a version indicated by the checksum 05F3A4. The networking device 512 has a version indicated by the same checksum 05F3A4. As such, the same version of the embedded application (version 05F3A4) is used to interface with both the networking device 510 and 512.

On the other hand, the networking device 514 has a version indicated by a different checksum 638D25. Although the embedded application is the same (e.g., embedded application A), the version is different. As such, only the version 638D25 can be used by the client workstation to interface with the networking device 514.

The client workstation 520 includes a loader 530 that launches the embedded application A for all networking deices that use the embedded application A as an interface. That is, the loader 530 is used only to launch all versions of the embedded application A. A different loader is used to launch a different embedded application (e.g., embedded application B).

In one embodiment, the loader is invoked when the shortcut to that loader is invoked. That is, when the user wants to access the embedded application A to interface with either the networking device 510, 512, or 514, the user can click the desktop shortcut for the loader 530. As such, the loader 530 is executed to determine if the client workstation has a correct version of the embedded application stored in memory 580 for a particular networking device.

Once the networking device is selected, the loader 530 communicates with that networking device to determine which version of the embedded application is proper to interface with that networking device. For example, the communications module 540 is used to establishing communication with the selected networking device. In particular, the user provides proper authentication credentials (e.g., IP address, username, and password) to connect to the proper networking device 510, 512, or 514.

The retriever 550 accesses the proper checksum value that identifies the version of the embedded application A for the selected networking device. That is, the retriever 550 accesses the first checksum value of the embedded application A that is stored on selected networking device. More particularly, the retriever 550 connects to the selected networking device and accesses the checksum. For example, the retriever accesses a 128 bit MD5 hash value based on the version of the embedded application stored on the selected networking device.

The comparator 560 will compare the first checksum of the embedded application A stored on the selected networking device against the second checksum of the locally stored version of the embedded application A. That is, if the same hash value version of the embedded application is installed locally on the client workstation 520, then the present embodiment is able to launch the locally stored version of the embedded application using the launcher 570. This occurs when the first checksum value matches the second checksum value.

For example, in the case of the networking device 510 the communication module would establish communication (e.g. via HTTP, HTTPS, or any suitable communication protocol) between the client workstation 520 and the networking device 510. The retriever 550 accesses the checksum of the embedded application A. In this case, the checksum is 05F3A4. In one embodiment, the checksum is in the header of the embedded application A stored on the networking device 510.

Thereafter, the comparator 560 accesses the checksum of the locally stored version of the embedded application A 595. In one embodiment, the comparator accesses a file name of the locally stored version of the embedded application. That is, the filename is the checksum of the locally stored embedded application. More particularly, when the embedded application is stored locally on the client workstation 520, the locally stored application is stored using a filename that is the checksum of that embedded application.

In this case, the client workstation 520 has stored an embedded application A with the file name 05F3A4, which is also the checksum. Since the checksum of the embedded application A stored on the network device 510 matches the checksum of the locally stored version of the embedded application, the locally stored version (05F3A4) of the embedded application can be launched by the launcher 570 to interface with the networking device 510.

Correspondingly, in the case of the networking device 512 the communication module 540 establishes communication (e.g. via HTTP, HTTPS, or any suitable communication protocol) between the client workstation 520 and the networking device 512. The retriever 550 accesses the checksum of the embedded application A. In this case, the checksum is also 05F3A4. As stated before, in one embodiment, the checksum is in the header of the embedded application A stored on the networking device 512.

Thereafter, the comparator 560 accesses the checksum of the locally stored version of the embedded application A. In one embodiment, the comparator accesses a file name of the locally stored version of the embedded application. In this case, the client workstation 520 has stored an embedded application A with the file name 05F3A4, which is also the checksum. Since the embedded application A with filename 05F3A4 has already been launched and is servicing networking device 510, the application version 05F3A4 need not be launched again. That is, the same embedded application is used to interface with both the networking device 510 and the networking device 512.

Alternatively, in the case of the networking device 514 the communication module 540 would establish communication (e.g. via HTTP, HTTPS, or any suitable communication protocol) between the client workstation 520 and the networking device 514. The retriever 550 accesses the checksum of the embedded application A. In this case, the checksum is 638D25. In one embodiment, the checksum is in the header of the embedded application A 590 stored on the networking device 514.

Thereafter, the comparator 560 accesses the checksum of the locally stored version of the embedded application A. In one embodiment, the comparator accesses a file name of the locally stored version of the embedded application as previously described. In this case, the client workstation 520 does not have a locally stored version (638D25) of the embedded application. In this case, the loader 530 will download the new application version (638D25) from the networking device 514 and copy it into the local memory 580 (e.g., cache memory) as indicated by path 593, as previously described. That is, the embedded application A with filename 638D25, as indicated by the dotted outline, is stored locally in memory 580 of the client workstation 520. Thereafter, the new version (638D25) is launched so that the user can interface with the networking device 514.

Accordingly, various embodiments of the present invention disclose a method and system for accessing and launching a java based embedded application of a remote device (e.g., applet) as a locally installed application. Embodiments of the present invention are capable of automatically upgrading the version of the embedded application that is locally stored to match the version of the embedded application stored on the remote device. In addition, embodiments of the present invention provide for the ability to launch directly from the client workstation, thereby bypassing a browser interface and effectively increasing the speed and efficiently when executing the embedded application to interface with the remote device.

While the methods of embodiments illustrated in flow chart 300 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

Embodiments of the present invention, a method and system for accessing and launching a java based embedded application of a remote device (e.g., applet) as a locally installed application are described. While the invention is described in conjunction with the preferred embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

What is claimed is:

1. A method comprising:
    launching a loader directly from a client workstation which bypasses a browser interface of the client workstation, wherein the loader is locally installed in the client workstation, and wherein the loader is configured to launch a java-based embedded application that is compatible a remote device;
    determining, with the loader, whether a local java-based embedded application stored in the client workstation is compatible with the java-based embedded application stored on the remote device by:
        accessing the remote device over a network to retrieve a first checksum value of the java-based embedded application that is stored on the remote device without downloading any java-based embedded application that is stored on the remote device after the loader is launched,
        accessing the local java-based embedded application stored locally in the client workstation to ascertain a second checksum value, and
        comparing, at the client workstation, the first checksum value of the java-based embedded application with the second checksum value of the local java-based embedded application stored in the client workstation;
    launching the local java-based embedded application in the client workstation with the loader when the first checksum value matches the second checksum value indicating the local java-based embedded application stored in the client workstation is compatible with the java-based embedded application stored on the remote device, the local java-based embedded application allowing the client workstation to configure the remote device over the network through an interface supported by the launched local java-based embedded application; and
    downloading, with the loader, the java-based embedded application from the remote device over the network when the first checksum value fails to match the second checksum value.

2. The method of claim 1, wherein said comparing of the first checksum value further comprises:
    determining the client workstation stores multiple local java-based embedded applications; and
    comparing the first checksum value of said java-based embedded application with a plurality of checksum values corresponding to the multiple local java-based embedded application to determine if one of the plurality of checksum values matches the first checksum value.

3. The method of claim 1, further comprising:
    before said launching of the loader, establishing communication with the remote device that is associated with the java-based embedded application through the browser window; and
    locally installing the loader on the client workstation.

4. The method of claim 3, wherein said locally installing further comprises:
    executing the loader independently of the browser window;
    downloading the java-based embedded application from the remote device over the network;
    storing the downloaded java-based embedded application as the local java-based embedded application; and
    naming a filename of a locally stored version of the java-based embedded application with the second checksum value.

5. The method of claim 1, wherein said comparing the first checksum value further comprises:
    accessing a filename of the local java-based embedded application to determine the second checksum value, wherein said filename comprises the second checksum value.

6. The method of claim 1, further comprising:
downloading the java-based embedded application from the remote device when the first checksum value does not equal the second checksum value;
storing the java-based embedded application as a locally stored version of the java-based embedded application; and
naming a filename of the local java-based embedded application using the first checksum value, wherein the filename comprises the second checksum value.

7. The method of claim 1, wherein the remote device comprises a networking device.

8. A computer system comprising:
a bus; and
a computer-readable memory includes program instructions that, when executed by a client workstation, cause the client workstation to:
launch a loader directly from the client workstation which bypasses a browser interface of the client workstation, wherein the loader is locally installed in the client workstation, and wherein the loader is configured to launch a java-based embedded application that is compatible a remote device;
determine, with the loader, whether a local java-based embedded application stored in the client workstation is compatible with the java-based embedded application stored on the remote device by accessing the remote device over a network to retrieve a first checksum value of the java-based embedded application that is stored on the remote device without downloading any java-based embedded application that is stored on the remote device after the loader is launched, accessing the local java-based embedded application stored locally in the client workstation to ascertain a second checksum value, and comparing, at the client workstation, the first checksum value of the java-based embedded application with the second checksum value of the local java-based embedded application stored in the client workstation; and
launch the local java-based embedded application in the client workstation with the loader when the first checksum value matches the second checksum value indicating the local java-based embedded application stored in the client workstation is compatible with the java-based embedded application stored on the remote device, the local java-based embedded application allowing the client workstation to configure the remote device over the network through an interface supported by the launched local java-based embedded application.

9. The computer system of claim 8, wherein the client workstation is further configured to
determine the client workstation stores multiple local java-based embedded applications; and
compare the first checksum value of said java-based embedded application with a plurality of checksum values corresponding to the multiple local java-based embedded application to determine if one of the plurality of checksum values matches said first checksum value.

10. The computer system of claim 8, wherein the program instructions, when executed, are further capable of:
establishing communication with the remote device that is associated with the java-based embedded application through the browser window;
locally installing the loader;
executing the loader independently of the browser window;
downloading the java-based embedded application from the remote device over the network;
storing the downloaded java-based embedded application as the local java-based embedded application; and
naming a filename of the local java-based embedded application with the second checksum value.

11. The computer system of claim 8, wherein the program instructions, when executed, are further capable of:
downloading the java-based embedded application from the remote device when the first checksum value does not equal the second checksum value;
storing the java-based embedded application as the local java-based embedded application; and
naming a filename of the local java-based embedded application using the first checksum value, wherein the filename comprises the second checksum value.

12. The computer system of claim 8, wherein the program instructions, when executed by the client workstation, are further capable of downloading the java-based embedded application from the remote device over the network when the first checksum value fails to match the second checksum value.

13. A computer-readable memory comprising computer executable instructions that, when executed by a processing system, cause the processing to:
launch a loader directly from a client workstation which bypasses a browser interface of the client workstation, wherein the loader is locally installed in the client workstation, and wherein said loader is configured to launch a java-based embedded application that is compatible a remote device;
determine, with the loader, whether a local java-based embedded application stored in the client workstation is compatible with the java-based embedded application stored on the remote device by accessing the remote device over a network to retrieve a first checksum value of the java-based embedded application that is stored on the remote device without downloading any java-based embedded application that is stored on the remote device after launching the loader, accessing the local Java-based embedded application stored locally in the client workstation to ascertain a second checksum value, and comparing, at the client workstation, the first checksum value of the java-based embedded application with the second checksum value of the local java-based embedded application stored in the client workstation; and
launch the local java-based embedded application in the client workstation with the loader when the first checksum value matches the second checksum value indicating the local java-based embedded application stored in the client workstation is compatible with the java-based embedded application stored on the remote device, the local java-based embedded application allowing the client workstation to configure the remote device over the network through an interface supported by the launched local java-based embedded application.

14. The computer-readable memory of claim 13, wherein the instructions, when further executed by the processing system, cause the processing system to:
before said launch of the loader, establish communication with the remote device that is associated with the java-based embedded application through the browser window; and
locally install the loader on the client workstation.

15. The computer-readable memory of claim 14, wherein the instructions, when further executed by the processing system, cause the processing system to:

execute the loader independently of the browser window;
download the java-based embedded application as the local java-based embedded application; and
name a filename of the local java-based embedded application with a checksum, the second checksum value, of the embedded application.

16. The computer-readable memory of claim 14, wherein the instructions, when further executed by the processing system, cause the processing system to:
download the java-based embedded application from the remote device when the first checksum value does not equal the second checksum value;
store the java-based embedded application as the local java-based embedded application; and
name a filename of the local java-based embedded application using the first checksum value, wherein the filename comprises the second checksum value.

17. The computer-readable memory of claim 13, wherein said instructions, when further executed by the processing system, cause the processing system to download the java-based embedded application from the remote device over the network when the first checksum value fails to match the second checksum value.

18. A system comprising:
means for launching a loader directly from a client workstation which bypasses a browser interface of the client workstation, wherein the loader is locally installed in the client workstation, and wherein the loader is configured to launch a java-based embedded application that is compatible a remote device;
means for accessing the remote device over a network to retrieve a first checksum value of the java-based embedded application that is stored on the remote device without downloading any java-based embedded application that is stored on the remote device after the means for launching launches the loader;
means for accessing the local java-based embedded application stored locally in the client workstation to ascertain a second checksum value;
means for comparing, at the client workstation, the first checksum value of the java-based embedded application with the second checksum value of the local java-based embedded application stored in the client workstation; and
means for launching the local java-based embedded application in the client workstation with the loader when the first checksum value matches the second checksum value indicating the local java-based embedded application stored in the client workstation is compatible with the java-based embedded application stored on the remote device, the local java-based embedded application allowing the client workstation to configure the remote device over the network through an interface supported by the launched local java-based embedded application.

19. The system of claim 18, further comprising:
means for determining the client workstation stores multiple local java-based embedded applications; and
means for comparing the first checksum value of the java-based embedded application with a plurality of checksum values corresponding to the multiple local java-based embedded application to determine if one of the plurality of checksum values matches the first checksum value.

20. The system of claim 18, further comprising means for downloading the java-based embedded application from the remote device over the network when the first checksum value fails to match the second checksum value.

* * * * *